United States Patent
Yi Lee et al.

(10) Patent No.: US 7,688,916 B2
(45) Date of Patent: Mar. 30, 2010

(54) METHOD AND APPARATUS FOR INITIALIZATION IN DIGITAL BROADCASTING RECEIVER

(75) Inventors: Sang Yi Lee, Gyeonggi-do (KR); Jin Pil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 666 days.

(21) Appl. No.: 11/698,276

(22) Filed: Jan. 26, 2007

(65) Prior Publication Data
US 2007/0174893 A1 Jul. 26, 2007

(30) Foreign Application Priority Data
Jan. 26, 2006 (KR) ................. 10-2006-0008397

(51) Int. Cl.
H03L 27/00 (2006.01)
H03K 9/00 (2006.01)

(52) U.S. Cl. .............. 375/316; 725/131; 725/139; 725/151

(58) Field of Classification Search ......... 375/316; 725/131, 139, 151
See application file for complete search history.

(56) References Cited

U.S. PATENT DOCUMENTS

| | | | | |
|---|---|---|---|---|
| 5,903,752 A | * | 5/1999 | Dingwall et al. | 718/103 |
| 6,650,710 B1 | * | 11/2003 | Hamery et al. | 375/240.29 |
| 7,590,860 B2 | * | 9/2009 | Leporini et al. | 713/185 |

* cited by examiner

*Primary Examiner*—Ted M Wang
(74) *Attorney, Agent, or Firm*—McKenna Long & Aldridge LLP

(57) ABSTRACT

An apparatus for initializing a digital broadcasting receiver and method thereof are disclosed, by which the digital broadcasting receiver provided with virtual machine to process additionally provided services can be quickly initialized. The present invention includes generating a first task required for initializing the digital broadcasting receiver in order to perform an A/V broadcasting service, generating a second task required for initializing a virtual machine installed in the digital broadcasting receiver to perform a data broadcasting service, initializing the digital broadcasting receiver included in the digital broadcasting receiver by executing the first task and initializing the virtual machine by executing the second task after the digital broadcasting receiver is initialized.

18 Claims, 2 Drawing Sheets

METHOD AND APPARATUS FOR INITIALIZATION IN DIGITAL BROADCASTING RECEIVER

This application claims the benefit of Korean Patent Application No. 10-2006-0008397, filed on Jan. 26, 2006, which is hereby incorporated by reference as if fully set forth herein.

BACKGROUND OF THE INVENTION

1. Field of the Invention

The present invention relates to an initialization of a digital broadcasting receiver, and more particularly, to an apparatus for initializing a digital broadcasting receiver and method thereof. Although the present invention is suitable for a wide scope of applications, it is particularly suitable for initializing the digital broadcasting receiver provided with devices to drive additionally provided services more quickly.

2. Discussion of the Related Art

Recently, broadcasting environments are rapidly changing from analog broadcasting to digital broadcasting. The digital broadcasting provides channels more than those of the conventional analog broadcasting and also provides various services in addition.

A digital broadcasting receiver should be capable of processing various services provided in addition to the basic audio/video broadcast services. So, the digital broadcasting receiver needs to be provided with such devices as modules to process the additionally provided services, virtual machines, etc.

The digital broadcasting receiver performs an initializing process if its power is turned on. In this case, the digital broadcasting receiver is able to process the corresponding services only if the provided module or virtual machine is initialized. Yet, the devices to process the additionally provided services except the basic audio/video services take more time for the initialization. And, this will cause more problems if the number of the devices is raised.

SUMMARY OF THE INVENTION

Accordingly, the present invention is directed to an apparatus for initializing a digital broadcasting receiver and method thereof that substantially obviate one or more problems due to limitations and disadvantages of the related art.

An object of the present invention is to provide an apparatus for initializing a digital broadcasting receiver and method thereof, by which the digital broadcasting receiver provided with devices to process additionally provided services can be quickly initialized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of initializing a digital broadcasting receiver according to the present invention includes generating a first task required for initializing the digital broadcasting receiver in order to perform an A/V broadcasting service, generating a second task required for initializing a virtual machine installed in the digital broadcasting receiver to perform a data broadcasting service, initializing the digital broadcasting receiver included in the digital broadcasting receiver by executing the first task and initializing the virtual machine by executing the second task after the digital broadcasting receiver is initialized.

Preferably, the method further includes generating a first queue message for executing the first task.

More preferably, the digital broadcasting receiver collects service information when the first task is executed.

More preferably, the digital broadcasting receiver provides the A/V broadcasting service using the collected service information.

More preferably, the method further includes generating a second queue message for executing the second task.

More preferably, the method further includes checking the generated second queue message.

More preferably, data required for providing the data broadcasting service is downloaded from a digital broadcasting transmitter when the first task is executed.

More preferably, the virtual machine is a java virtual machine (JVM) which provides a java-based application for the data broadcasting service.

In another aspect of the present invention, a digital broadcasting receiver includes a first decoder generating a first task required for initializing the digital broadcasting receiver in order to perform an A/V broadcasting service and executing the first task, a second decoder generating a second task required for initializing a virtual machine installed in the digital broadcasting receiver to perform a data broadcasting service, an application manager controlling the first decoder and the second decoder and receiving the second task from the second decoder and a task executing unit receiving the second task from the application manager and executing the second task after the digital broadcasting receiver is initialized.

Preferably, the digital broadcasting receiver further includes a tuner receiving a digital broadcast signal, a demodulator demodulating the received digital broadcast signal, a demultiplexer demultiplexing a PSI/PSIP table within the demodulated digital broadcast signal and a display device providing the A/V service and data broadcasting service.

Preferably, the first decoder generates a first queue message in order to execute the first task.

More preferably, the first decoder collects service information in executing the first task.

Preferably, the second decoder downloads data required from a digital broadcasting transmitter when the first task is executed.

Preferably, the application manager generates a second queue message in order to execute the second task.

More preferably, the application manager transfers the generated second queue message after the digital broadcasting receiver is initialized.

More preferably, the application manager transfers the generated second message after the required data is downloaded.

Preferably, the task executing unit checks the second queue message from the application manager.

Preferably, the virtual machine is java virtual machine (JVM) which provides java-based applications the data broadcasting service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

An initialization in a digital broadcasting receiver according to the present invention is explained with reference to FIG. 1 and FIG. 2 as follows.

In the following description, service information or system information for digital broadcasting abides by program and system information protocol (PSIP) according to terrestrial digital broadcasting specification for example. Yet, the present invention is also applicable to digital video broadcasting-service information (DVB-SI), out of band-service information (OOB-SI).

And, a data broadcasting service, which provides a java-based java application adopted by North America, Europe and Korean digital broadcasting, is taken as an example for a provided service associated with the present invention.

A digital broadcasting receiver should be equipped with a virtual machine to process the provided data broadcasting service. In this case, a java virtual machine (hereinafter abbreviated JVM) is taken as an example for the virtual machine.

The JVM means software playing a role as a central processing unit (CPU) of a personal computer (PC) for example. The JVM is able to execute byte codes configuring a class file generated by compiling java source codes. So, the digital broadcasting receiver is able to execute byte codes if any platform is equipped with the JVM.

When a power of the digital broadcasting receiver is turned on, the digital broadcasting receiver equipped with the JVM is able to process and provide a corresponding data broadcasting service only if the digital broadcasting receiver including the JVM is initialized.

In case of executing an initialization process, if the digital broadcasting receiver provides a user with an audio/video broadcast service corresponding to an initial channel after having initialized the JVM, it is inconvenient for the user to stand by for the extended initialization process or time.

To solve this problem, in the present invention, a process for initializing the JVM is generated as a separate task together with a task for a basic operation of the digital broadcasting receiver. And, the process for initializing the JVM is executed after an audio/video broadcast service as the basic operation of the receiver has been provided to a user.

Figure 1:
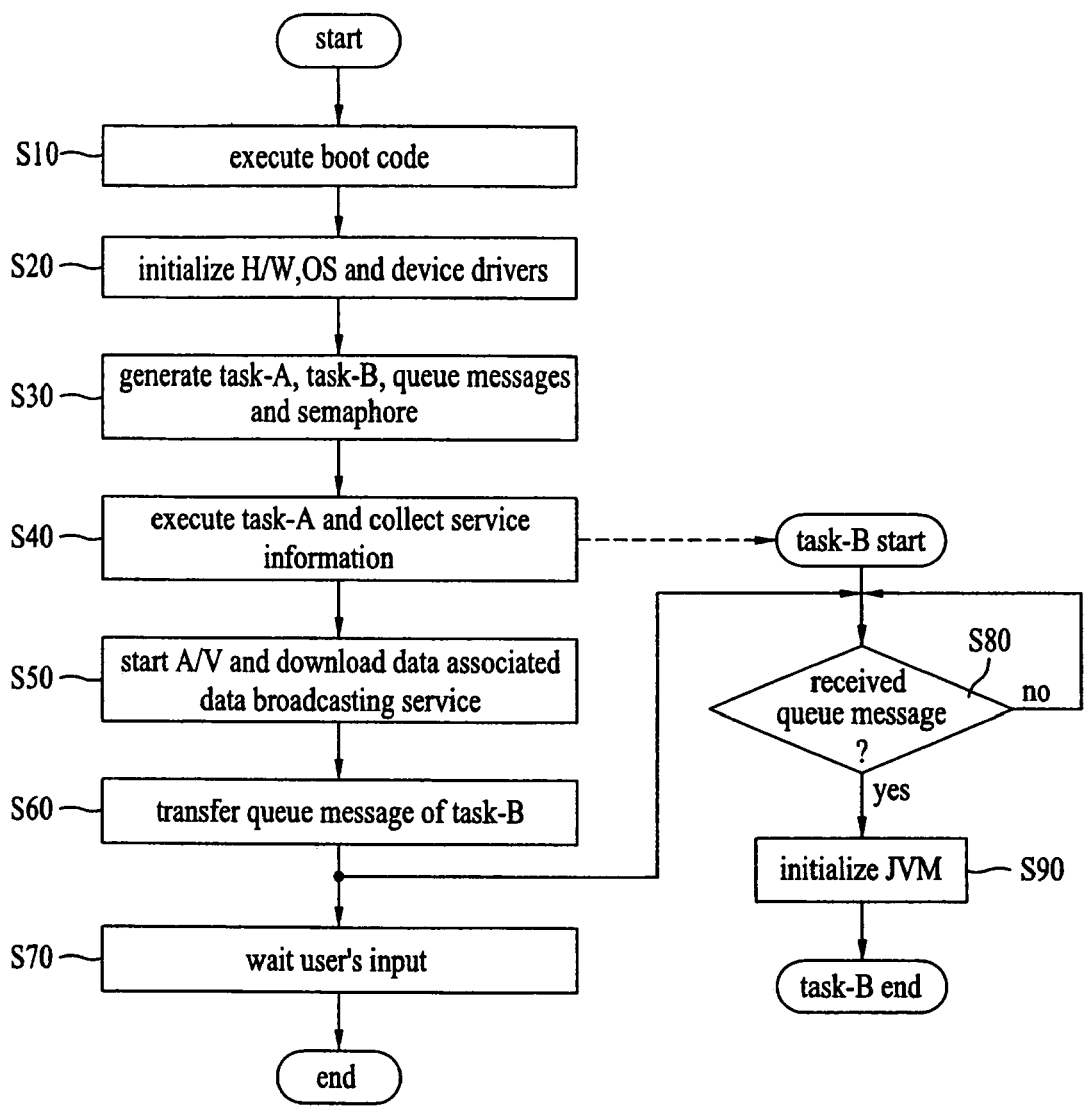
FIG. 1 is a flowchart of a method of initializing a digital broadcasting receiver according to the present invention.

FIG. 1 is a flowchart of a method of initializing a digital broadcasting receiver according to the present invention.

Referring to FIG. 1, once a power is turned on, a digital broadcasting receiver executes an initialization process. In particular, the digital broadcasting receiver executes a boot code to execute an execution image stored in a flash ROM (S10). The digital broadcasting receiver then initializes hardware, operating system (OS), and various device drivers loaded therein (S20).

Subsequently, the digital broadcasting receiver generates operational tasks (hereinafter named 'task-A') for basic receiver operations, a task (hereinafter named task-B') for initializing JVM proceeded to process additionally provided data broadcasting service, a queue message as an execution message for each of the tasks, and a semaphore (S30).

The digital broadcasting receiver executes the task-A to collect service information including broadcast channel information (S40). The digital broadcasting receiver provides a user with audio/video broadcasting service corresponding to an initial channel based on the collected information. In this case, if data needs to be downloaded in processing a data broadcasting service providing the java-based java application, a data download is performed (S50). Through the above-explained steps, the digital broadcasting receiver is able to provide an audio/video broadcast service corresponding to the initial channel if the user turns on the power.

Yet, in order to provide a data broadcasting service, the JVM needs to be initialized. So, the digital broadcasting receiver transfers the generated queue message for executing the task-B (S60).

And, the digital broadcasting receiver decides whether the queue message as an execution message for the task-B is received (S80). As a result of the decision, if the queue message is received, the digital broadcasting receiver executes the task-B to perform an initialization process for the JVM (S90). If the queue message is not received, the digital broadcasting receiver stands by while checking whether the queue message is received.

The digital broadcasting receiver waits for a user's input (S70). In this case, after the audio/video broadcasting service has been provided as a result of the execution of the task-A in the above steps, the digital broadcasting receiver is able to wait for the user's input to enable the user to select another channel after the initial channel for example.

As mentioned in the foregoing description, it will be convenient for the user to view the audio/video broadcasting service within a predetermined or same time after the power of the digital broadcasting receiver has been turned on, despite the increased number of provided services attributed to the activation of digital broadcasting.

Thus, in initializing the digital broadcasting receiver, although the task-A and the task-B are generated respectively, an execution time of the task-B is set behind the timing point of providing the user with the audio/video broadcasting service according to the execution of the task-A.

In the following description, a digital broadcasting receiver executing the task-A and the task-B is explained.

Figure 2:
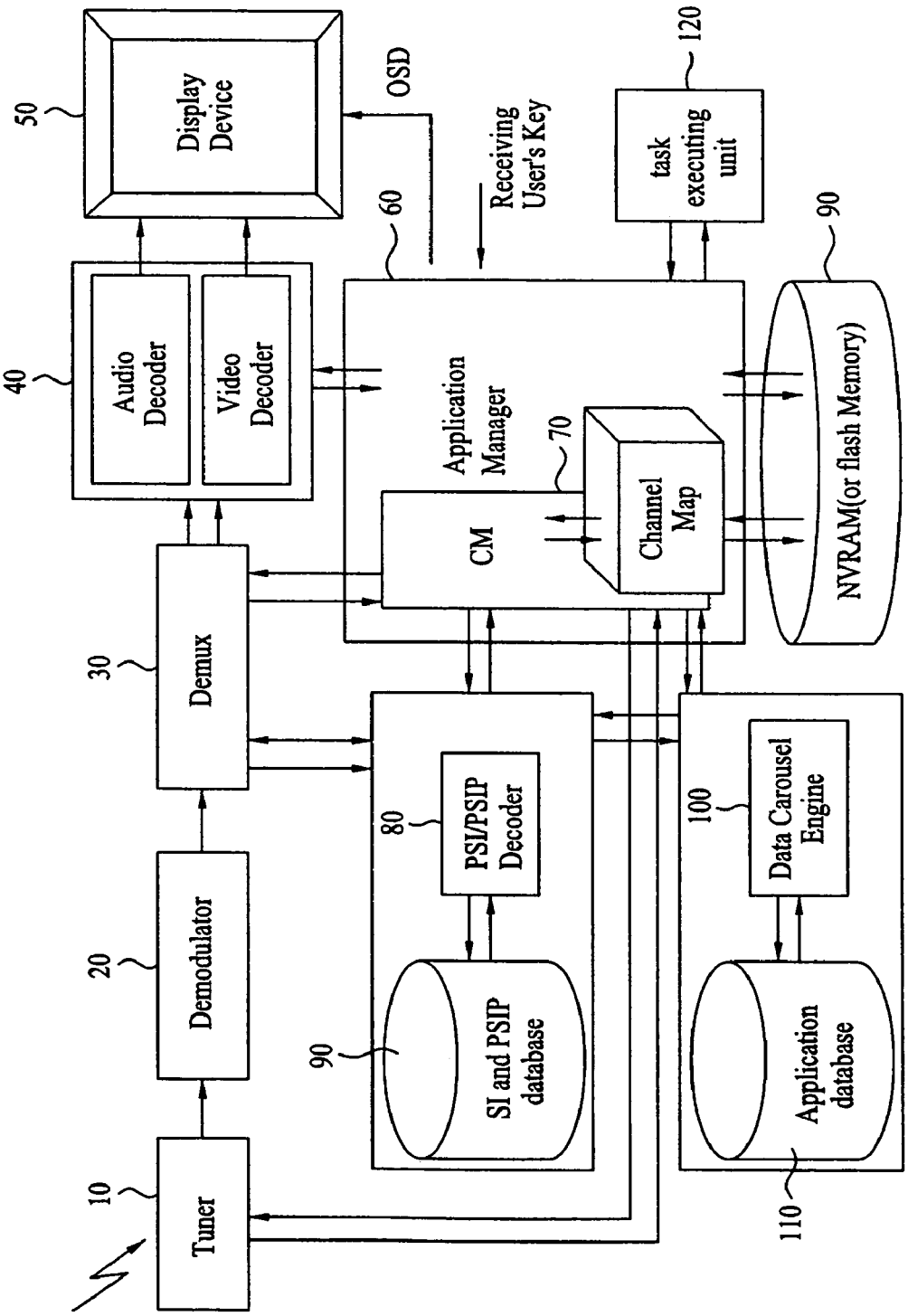
FIG. 2 is a block diagram of a digital broadcasting receiver according to the present invention.

FIG. 2 is a block diagram of a digital broadcasting receiver according to an embodiment of the present invention.

Referring to FIG. 2, a digital broadcasting receiver according to an embodiment of the present invention includes a tuner 10, a demodulator 20, a demultiplexer 30, an audio/video decoder 40, a display device 50, an application manager 60, a channel manager 70, a program specific information/program and system information protocol (PSI/PSIP) decoder 80, a SI/PSIP (service information/PSIP) database 90, a data carousel engine 100, application database 110 and a task executing unit 120.

An operation of the above-configured digital broadcasting receiver is explained as follows.

First of all, the tuner 10 receives a broadcast signal via an antenna and then transmits the received broadcasting signal to the demodulator 20. In this case, the broadcasting signal is transmitted via terrestrial or cable. And, the tuner 10 reports a result and strength of the received broadcasting signal to the channel manager 70 under the control of the channel manager 70.

The demodulator 20 demodulates the broadcasting signal received from the tuner 10. In this case, the demodulator 20 performs demodulation by 64 VSB (vestigial side band) or 256 VSB if the broadcast signal was transmitted by terrestrial or by 64 QAM (quadrature amplitude modulation) or 256 QAM if the broadcasting signal was received by cable.

The demultiplexer 30 receives transport packets outputted from the demodulator 20 and demultiplexes the received transport packets to filter audio, video, PSI/PSIP tables and data broadcasting service associated tables which are included in the transport packets.

The demultiplexer 30 is controlled by the PSI/PSIP decoder 80 in case of demultiplexing the PSI/PSIP tables. And, the demultiplexer 30 is controlled by the data carousel engine 100 in case of demultiplexing the data broadcasting service associated tables. In particular, in demultiplexing the tables, the demultiplexer 30 collects the respective section by performing the corresponding filtering under the controls of the PSI/PSIP decoder 80 and the data carousel engine 100 and then transfers the collected sections to the decoders 80 and 100, respectively.

And, the demultiplexer 30 demultiplexes the audio packets and the video packets included in the transport packets under the control of the channel manager 70. In particular, if audio packet identifier (PID) and/or video PID of a virtual channel is set by the channel manager 70, the demultiplexer 30 transfers an audio elementary stream having the set audio PID and a video elementary stream having the set video PID to the audio/video decoder 40.

The audio/video decoder 40 decodes the audio elementary streams received from the demultiplexer 30 by audio coding-3 (AC-3) and the video elementary streams received from the demultiplexer 30 by moving picture experts group-2 (MPEG-2) or the like. The audio/video decoder 40 synchronizes the decoded audio data and/or video data using a video display processor (VDP) and then outputs the synchronized data to the display device 50.

The display device 50 receives the audio and/or video data synchronized and outputted from the audio/video decoder 40 and then outputs the received data via a speaker and screen, respectively. In this case, the display device 50 outputs the video data via the screen under the control of on screen display (OSD) by the application manager 60.

The application manager 60 controls a graphic user interface (GUI) displaying a status of a receiving system by OSD or recovers or stores a user request in a storage unit such as a non-volatile random access memory (NVRAM) and a flash memory. In case of receiving a key input by a user, the application manager 60 manages a user interface (UI) to correspond to the user's request via the GUI on a display screen. And, the application manager 60 controls the tuner 10 via the PSI/PSIP decoder 80 and the channel manager 70 to manage a channel map according to a channel request made by the user.

The channel manager 70 requests the PSI/PSIP decoder 80 to parse the table including the information for a channel to be tuned. The channel manager 70 then receives a result from parsing the table according to the request from the PSI/PSIP decoder 80. So, the channel manager 70 updates the channel map using the received parsing result and makes a decoding request by setting the corresponding audio/video PIDs in the demultiplexer 30 from the updated channel map.

The PSI/PSIP decoder 80 is a PSI/PSIP control module that performs a slave operation according to a control of the channel manager 70. In particular, the PSI/PSIP decoder 80 sets PIDs of the PSI/PSIP tables in the demultiplexer 30.

The PSI/PSIP decoder 80 receives and parses the PSI sections collected by the demultiplexer 30 according to the setup and then establishes a PSI database. The PSI/PSIP decoder 80 receives and parses the PSIP sections collected by the demultiplexer 30 according to the setup and then establishes an SI/PSIP database 90. In this case, the PSI/PSIP decoder 80 parses the portions failing to be parsed in case that the demultiplexer 30 collects the corresponding sections according to the setup. Namely, the demultiplexer 30 parses header part of sections in collecting the corresponding sections. So, the PSI/PSIP decoder 80 parses body part including real data except the header part to establish the corresponding database.

The PSI/PSIP decoder 80 receives data broadcasting associated tables like a data event table (DET) collected by the demultiplexer 30 for data broadcasting and then transfers the received tables to the data carousel engine 100.

The data carousel engine 100 interprets data by parsing the data broadcasting associated tables transferred by the demultiplexer 30 under the control of the PSI/PSIP decoder 80 and then establishes an application database 110 by assembling files together.

In this case, once the application database 110 is established, the application manager 60 decides whether to update the data associated with the data broadcasting. If an update situation takes place according to a result of the decision, the application manager 60 maintains the latest information stored in the application database 110 through re-interpretation of the corresponding situation.

If the power of the digital broadcasting receiver is turned on, the tuner 10, demodulator 20, demultiplexer 30 and audio/video decoder 40 of the above-configured digital broadcasting receiver are initialized in initializing the hardware and various device drivers.

The PSI/PSIP decoder 80, the data carousel engine 100 and the application manager 60 are able to have task, queue message and semaphore, respectively. And, the task, queue message and semaphore are generated, initialized and executed in the initialization process of the digital broadcasting receiver.

In particular, in performing the initialization process after the power of the receiver has been turned on, the application manager 60 controls the audio/video decoder 40 and the PSI/PSIP decoder 80 to make and execute the task-A to process a basic audio/video broadcasting service. In this case, the application manager 60 controls the data carousel engine 100 to perform the data download together with the execution of the task-A to handle the data broadcasting service that provides the java-based java application.

The application manager 60 controls the data carousel engine 100 to make the task-B separate from the task-A to initialize the JVM for processing the data broadcasting service providing the java-based java application. And, the application manager 60 receives the made task-B from the data carousel engine 100 and transfers the received task-B to the task executing unit 120. And, the application manager 60 makes a queue message as an execution message for executing the task-B and then transfers the queue message to the task executing unit 120. In this case, the application manager 60 transfers the queue message as the execution message of the task-B after the audio/video service according to the execution result of the task-A has been provided to a user or after the data download necessary for the data broadcasting service has been completed. So, the digital broadcasting receiver is able to more quickly provide the data broadcasting service requested by the user after the power of the digital broadcasting receiver has been turned on.

The task executing unit 120 receives the task-B from the application manager 60 and then decides whether the queue message as the execution message of the received task-B is received. As a result of the decision, if the queue message is received, the task executing unit 120 executes the task-B to perform the initialization process of the JVM.

If the task-A is executed, the digital broadcasting receiver collects the service information including the television (TV) channel information therein and then provides a user via the display device 50 with an audio/video broadcasting service corresponding to an initial channel based on the collected information. In this case, in executing the task-A, the data broadcasting service can be quickly implemented in a manner of downloading the data necessary for the data broadcasting in advance.

As mentioned in the above description, if the audio/video broadcasting service corresponding to the initial channel due to the execution of the task-A is provided to a user of if a download of the data for the data broadcasting service is completed, the application manager 60 initializes the JVM to wait for a user's input by transferring the queue message as the execution message to the task executing unit 120 to execute the prepared task-B.

In case of receiving the generated task-B, the task executing unit 120 should keep checking whether the queue message as the execution message for the task-B is received. As a result of the check, if the execution message is received, the task executing unit 120 performs initialization by executing the task-B to be ready for the implementation of the corresponding service.

In this case, the task-B for initializing a device provided to process an additionally provided service is made together with the task-A to implement the service additionally provided to the digital broadcasting receiver as a concept similar to the multi-tasking.

Accordingly, the present invention provides the following effects or advantages.

First of all, if a power of the digital receiver is turned on, the digital broadcasting receiver preferentially provides an audio/video broadcasting service corresponding to an initial channel first contacting with a user despite the increase number of provided services provided to the digital broadcasting receiver. And, the inconvenience caused to a user by the delayed time taken for initialization can be minimized in a manner of generating a separate task for a service such as an additionally provided data broadcasting service and executing the generated task after a timing point of providing the audio/video broadcasting service to the user. The advantage of the present invention is further enhanced if the number of the services provided to the user is increased.

Secondly, by performing such a process as a data download and the like, which is expected to consume a separate time to process a service provided to a digital broadcasting receiver, prior to an initialization process in advance, the present invention can contribute to the quick processing of the corresponding service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of initializing a digital broadcasting receiver, the method comprising:
   generating a first task required for initializing the digital broadcasting receiver in order to perform an A/V broadcasting service;
   generating a second task required for initializing a virtual machine installed in the digital broadcasting receiver to perform a data broadcasting service;
   initializing the digital broadcasting receiver included in the digital broadcasting receiver by executing the first task; and
   initializing the virtual machine by executing the second task after the digital broadcasting receiver is initialized.

2. The method of claim 1, further comprising generating a first queue message for executing the first task.

3. The method of claim 1, wherein the digital broadcasting receiver collects service information when the first task is executed.

4. The method of claim 3, wherein the digital broadcasting receiver provides the A/V broadcasting service using the collected service information.

5. The method of claim 2, further comprising generating a second queue message for executing the second task.

6. The method of claim 5, further comprising checking the generated second queue message.

7. The method of claim 1, wherein data required for providing the data broadcasting service is downloaded from a digital broadcasting transmitter when the first task is executed.

8. The method of claim 1, wherein the virtual machine is a java virtual machine (JVM) which provides a java-based application for the data broadcasting service.

9. A digital broadcast receiver, comprising:
   a first decoder generating a first task required for initializing the digital broadcasting receiver in order to perform an A/V broadcasting service and executing the first task;
   a second decoder generating a second task required for initializing a virtual machine installed in the digital broadcasting receiver to perform a data broadcasting service;
   an application manager controlling the first decoder and the second decoder and receiving the second task from the second decoder; and
   a task executing unit receiving the second task from the application manager and executing the second task after the digital broadcasting receiver is initialized.

10. The digital broadcasting receiver of claim 9, further comprising:
    a tuner receiving a digital broadcast signal;
    a demodulator demodulating the received digital broadcast signal;
    a demultiplexer demultiplexing a PSI/PSIP table within the demodulated digital broadcast signal; and
    a display device providing the A/V service and data broadcasting service.

11. The digital broadcasting receiver of claim 9, wherein the first decoder generates a first queue message in order to execute the first task.

12. The digital broadcasting receiver of claim 9, wherein the first decoder collects service information in executing the first task.

13. The digital broadcasting receiver of claim 9, wherein the second decoder downloads data required from a digital broadcasting transmitter when the first task is executed.

14. The digital broadcasting receiver of claim 9, wherein the application manager generates a second queue message in order to execute the second task.

15. The digital broadcasting receiver of claim 9, wherein the application manager transfers the generated second queue message after the digital broadcasting receiver is initialized.

16. The digital broadcasting receiver of claim 13, wherein the application manager transfers the generated second message after the required data is downloaded.

17. The digital broadcasting receiver of claim 15 or claim 16, wherein the task executing unit checks the second queue message from the application manager.

18. The digital broadcasting receiver of claim 9, wherein the virtual machine is java virtual machine (JVM) which provides java-based applications the data broadcasting service.

* * * * *